United States Patent [19]

Wysk et al.

[11] 4,354,354
[45] Oct. 19, 1982

[54] SYSTEM FOR RECOVERY OF SULFUR DIOXIDE IN AN MHD POWER PLANT

[75] Inventors: Stanley R. Wysk, Suffield; James P. Clark, III, Amston, both of Conn.

[73] Assignee: Combustion Engineering, Inc., Windsor, Conn.

[21] Appl. No.: 181,323

[22] Filed: Aug. 25, 1980

[51] Int. Cl.$^3$ .......................... F01K 23/04; H02N 4/02
[52] U.S. Cl. ........................................... 60/655; 310/11
[58] Field of Search ................ 60/643, 645, 648, 655, 60/670, 698; 310/11; 423/244, 244 A

[56] References Cited

U.S. PATENT DOCUMENTS

| | | | |
|---|---|---|---|
| 3,895,243 | 7/1975 | Amend et al. | 310/11 |
| 4,107,557 | 8/1978 | Shepherd | 310/11 |
| 4,163,910 | 8/1979 | Matthews et al. | 310/11 |
| 4,239,996 | 12/1980 | Bhada et al. | 310/11 |

Primary Examiner—Allen M. Ostrager
Assistant Examiner—Stephen F. Husar
Attorney, Agent, or Firm—Arthur L. Wade

[57] ABSTRACT

The seed, in the form of $K_2SO_4$, is fed into an MHD combustor, mechanically recovered, and recycled. Sulfur dioxide in the discharge of the MHD channel is recovered downstream by a fluidized bed of lime/limestone.

6 Claims, 1 Drawing Figure

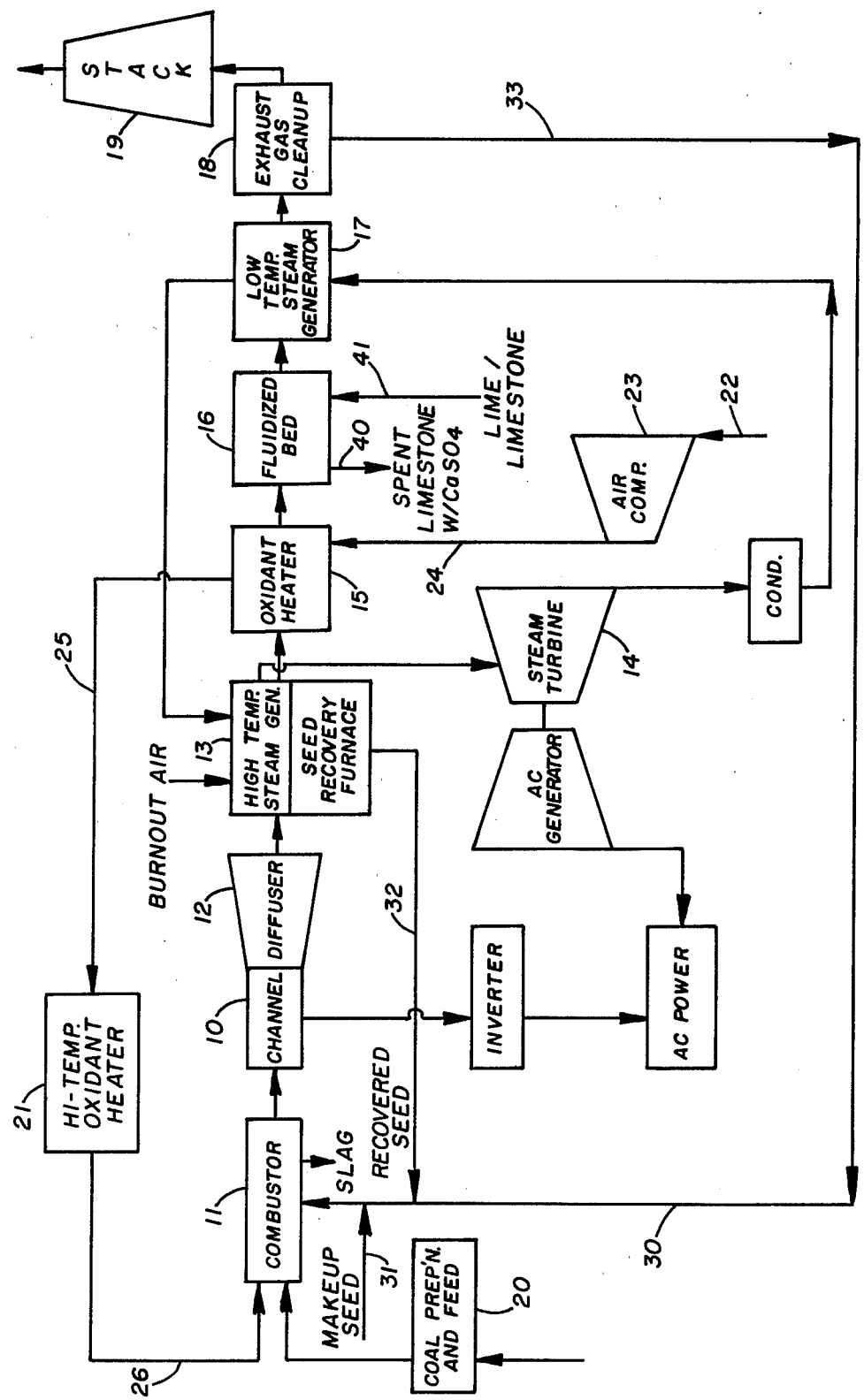

SYSTEM FOR RECOVERY OF SULFUR DIOXIDE IN AN MHD POWER PLANT

TECHNICAL FIELD

The present invention relates to the removal of sulfur compounds from the output gases of an MHD channel by lime/limestone. More particularly, the invention relates to utilization of recycled seed in an MHD power system in the form of $K_2SO_4$ while carrying out a basic recovery of sulfur compounds in a fluidized bed of lime/limestone.

BACKGROUND ART

The MHD channel requires a fluid stream with a high temperature, passing at a high velocity through a static magnetic field and having a constituent of ionizable material. Part of the heat energy of the fluid stream is converted directly into electrical energy by an MHD generator. Additional heat energy of the fluid stream is converted into electrical energy by a vapor generator whose output is converted into electrical energy by a turbine coupled to an electrical generator. The efficiency of the conversion by the MHD generator and vapor generator can be as high as 50%.

The well-established problems of bringing combustion air up to about 2500 F. and supplying appropriate fuel to the MHD generator, are well known. The ionized components of the products of combustion are enhanced by the introduction of seed, usually a form of potassium such as $K_2CO_3$ or $KCO_2H$. $SO_2$ in the products of combustion will combine with these potassium compounds and form $K_2SO_4$. Common accepted practice has been to apply one of several available chemical processes to extract the sulfur of $K_2SO_4$, regenerate fresh potassium seed, and recycle this seed to the combustor. The sulfur compound level of the output gas has been thereby reduced toward acceptable environmental standards.

Seed in the form of $K_2SO_4$ can also be used to ionize gases leaving the MHD combustor. Providing that this seed can be recovered downstream of the MHD diffuser, there remains the problem of lowering the $SO_2$ level of the diffuser discharge after passage through the vapor generator receiving the channel output. If the $SO_2$ level can be reduced without seed regeneration for reduction of $K_2SO_4$, the system will be less complex to operate and will consume less auxiliary energy. The energy consumption of seed regeneration processes frequently has a significant effect on the conversion efficiency of the combined plant, and cost of electricity. Most seed regeneration processes are wet processes, involving dilute potassium solutions. The energy requirements to evaporate this water from the solutions can add substantial penalties to the plant. In addition, few of these processes have, to date, been successfully demonstrated.

DISCLOSURE OF THE INVENTION

The present invention contemplates recycling ionizable seed in the form of $K_2SO_4$ between the output of an MHD generator and its combustor while removing $SO_2$ downstream with a fluidized bed of lime/limestone.

Other objects, advantages, and features of the invention will become apparent to one skilled in the art upon consideration of the written specification, appended claims and accompanying drawing.

BRIEF DESCRIPTION OF THE DRAWING

The FIGURE is a flow diagram of the fluids flowing between and through the components of a power generating system as contemplated in the present invention.

BEST MODE FOR CARRYING OUT THE INVENTION

Overview

The drawing illustrates the well-known combination of an MHD generator and one or more vapor generators receiving the high temperature fluid discharged from the channel. The channel produces electrical energy in direct conversion of the energy of the ionized fluid flowing through the channel, and the vapor generator, or generators, usually produce water vapor which can be used to operate turbines to drive electric generators.

Channel 10 receives the high temperature, high velocity gaseous output of combustion chamber 11 and discharges this gas stream from diffuser 12. The vapor generator 13 receives the hot gaseous output of diffuser 12 as its sole source of heat to generate steam for turbine 14. Additional heat may be required from separately-fired burners, but this arrangement need not be a part of the present disclosure. The hot gas discharged from vapor generator 13 is then routed through an air preheater 15, a fluidized bed 16, and a second vapor generator 17. A final gas cleanup structure 18 may receive the cooled gaseous output from this line of equipment. Here the gas is prepared for discharge to the atmosphere through stack 19. Residual quantities of particulates, including seed not recovered upstream, are mechanically, or electrically, removed and recycled back into the upstream system.

Fuel and Air to the Combustor

There are the standard problems of supplying fuel and combustion air to the combustor, or burner, 11 to generate the original high temperature, high velocity gaseous output to channel 10. A source of fuel for combustor 11 is symbolized at 20. This source may be coal, oil, gas, or combinations, which depend upon factors of availability and desired techniques for the combustion of these materials at 11. The cleaner the fuel, the better. However, the fossil fuels available usually have sulfur compounds which end up in the gaseous products of combustion. These compounds, principally $SO_2$, must be removed before the products of combustion can be discharged to the atmosphere. At least, the quantity of the sulfur compounds in the products of combustion must be reduced to levels satisfactory to regulatory agencies.

The oxidant, or combustion air, which must be fed into combustor 11, must be brought up to a significantly high temperature level to insure that the gaseous discharge to channel 10 is ionized for the passage through the magnetic field for the resulting production of electrical energy. The final temperature of this combustion air can be established by the operation of heater 21, or by oxygen enrichment. As shown in the drawing, the heater 21 can have its supply of air preheated from heater 15. This air originates from the atmosphere, being drawn into the system through conduit 22, compressed by 23 and connected to heater 15 by conduit 24. Conduit 25 conducts the pressurized and heated combustion air to independently-fired heater 21. Finally, the combustion air, brought up to a temperature of approximately 2500 F., is conducted to combustor 11 by conduit 26. The temperature of the products of combustion may also be elevated by controlling the oxygen content of the combustion air. Although not considered part of the present disclosure, a supply of oxygen could be connected to introduce oxygen into the combustion air to supplement heating of the air.

The Present Problem

The present invention deals with the problem that whatever fuel is supplied to combustor 11 from source 20, there is a significant component of sulfur present as a contaminant. Whatever the amount of sulfur, it combines with the combustion air to produce $SO_2$ and other sulfur compounds to form an unacceptable discharge to the environment from stack 19. This sulfur must be reduced to acceptable levels to obviate its discharge to the environment and prevent its corrosion effect on the equipment with which it comes in contact.

To enhance the ionizable characteristics of the gaseous output of combustor 11, potassium compounds have been added to the system at the combustor. The addition of this "seed" is symbolized by conduit 30 which conveys makeup seed of conduit 31, recycled seed from vapor generator 13 through conduit 32, and seed swept up by structure 18 through conduit 33, into combustor 11.

It has been customary to utilize the seed material as a vehicle for extracting the sulfur compounds in the gases discharged from combustor 11. The potassium compounds form $K_2SO_4$ with sulfur. The $K_2SO_4$ can be broken down by any of several processes to extract the sulfur, regenerate the potassium compounds, and recycle these compounds to combustor 11. From a practical view, the utility operator, considering this system for use, is repelled by the prospect of what amounts to a separate chemical plant in which the $K_2SO_4$ is continuously broken into recovered potassium seed and disposable sulfur.

Solution of the Problem

It is at this point that the present invention is brought in to cut the difficult, if not, Gordian knot. Analysis shows that $K_2SO_4$ will function satisfactorily as seed to produce the ionized working fluid required for channel 10. Removal of sulfur compounds downstream of generator 13 is provided while letting the $K_2SO_4$ recycle as acceptable seed to combustor 11.

To recycle the $K_2SO_4$ as seed, it must be condensed, solidified, and mechanically separated from the gaseous discharge of diffuser 12. The present invention contemplates providing a high efficiency mechanical separator, such as a cyclone or granular bed filter, within the unit 13 to mechanically separate the condensed seed. High efficiency in the context of this application contemplates a mechanical separator having an efficiency of 85%, or more. Cyclone structures, operating at high temperatures in the neighborhood of 1700-2300 F., are practical. Such structure is contemplated to collect the condensed $K_2SO_4$ seed and discharge the seed to conduit 32.

The present invention has its raison d'etre in fluidized bed 16. At 16 there is introduced into the system, a body of lime/limestone through which the gases from generator 13 are passed. Brought into contact with lime/limestone, the sulfur compounds are absorbed and removed through conduit 40. Of course, lime/limestone is continuously supplied to bed 16 through conduit 41. The operation of this lime/limestone bed may use fluidized techniques to maintain the intimate contact necessary for removal of the sulfur compounds.

$SO_2$-laden gas must be cooled sufficiently in the high temperature steam generator for optimum sulfur capture. Ideally, this gas will enter the fluidized bed at a temperature in the range of 1500-1700 F., which is optimum for calcination and sulfation. A 4-to-1 calcium/sulfur mole ratio is expected to remove 90% (or better) of the entering sulfur. This ratio can be adjusted and refined to satisfy existing environmental requirements. The sulfated lime/limestone is removed for disposal, concurrent with the addition of fresh lime/limestone to maintain adequate bed height.

Conclusion

The present invention contemplates recycle of seed for an MHD generator in the form of $K_2SO_4$. It is not necessary to regenerate the $K_2SO_4$ and recycle only the potassium compound as seed in removal of sulfur compounds from the system. The $K_2SO_4$ need not function as a vehicle for control of sulfur compounds in the stack exhaust.

Sulfur components of the MHD channel output gases are basically reduced to acceptable levels by lime/limestone bed 16. No longer is the control of sulfur compounds carried out in the seed cycle. The point of extraction is shifted to the downstream position occupied by bed 16.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

The invention having been described, what is claimed is:

1. The method of operating an MHD generator, including, supplying fuel containing sulfur compounds and air to the combustor of the MHD generator, flowing the products of combustion containing sulfur compounds from the combustor through the channel of the generator to produce electrical energy directly, supplying potassium compounds to the combustor as seed for the MHD generator, recovering the $K_2SO_4$ formed by the potassium seed and sulfur compounds from the products of combustion discharged from the channel, recycling the $K_2SO_4$ seed to the combustor, converting heat energy of the products of combustion from the channel into steam, and contacting the products of combustion from the steam generation with a body of lime/limestone to reduce the sulfur compounds of the products of combustion to a desired level.

2. The method of claim 1 in which the products of combustion from the steam generation are in the range of 1500–1700 F.

3. A system for removing sulfur compounds from an MHD and a vapor generator cycle, including,
a combustor for an MHD channel,
a source of fuel containing sulfur compounds connected to the combustor,
a source of seed comprising potassium compounds connected to the combustor,
an MHD channel connected to the combustor to receive the combustor output of ionized gaseous fluid,
a vapor generator connected to the MHD channel to receive the discharged gaseous fluid as a source of heat to convert water into steam,
means for utilizing the steam vapor output of the generator to produce electrical energy,
means for collecting $K_2SO_4$ formed in the MHD channel gaseous discharge which is condensed and solidified downstream of the channel,
a recycle circuit between the collecting means for the condensed $K_2SO_4$ seed and the combustor,
and a body of lime/limestone connected to the output of the vapor generator to receive the gaseous discharge from the vapor generator to contact the sulfur compounds in the gaseous discharge and reduce the percentage to a desirable level in the gaseous discharge from the lime/limestone body.

4. The removal system of claim 3, including,
a high efficiency mechanical separator which is included in the means of downstream of the channel in which the condensed $K_2SO_4$ seed is received and separated from the gaseous discharge of the channel.

5. The removal system of claim 3, in which,
the source of potassium compound supplied the combustor is arranged to introduce that additional potassium compound which will compensate for that loss of the compound downstream of the channel.

6. The removal system of claim 3, including,
means for fluidizing the lime/limestone body while the gaseous output of the channel containing sulfur compounds is passed through the body to make intimate contact with the lime/limestone.

* * * * *